United States Patent [19]
Morgan

[11] Patent Number: 5,151,043
[45] Date of Patent: Sep. 29, 1992

[54] ELECTRICAL POWER DISTRIBUTION BUSWAY WITH ISOLATED GROUND BUS

[75] Inventor: Robert W. Morgan, Spartanburg, S.C.

[73] Assignee: Siemens Energy & Automation, Inc., Alpharetta, Ga.

[21] Appl. No.: 504,094

[22] Filed: Mar. 30, 1990

Related U.S. Application Data

[63] Continuation of Ser. No. 288,530, Dec. 22, 1988, abandoned.

[51] Int. Cl.⁵ .................. H01R 25/16; H01R 13/648
[52] U.S. Cl. ......................... 439/212; 439/213; 439/100
[58] Field of Search ............... 439/113, 114, 207–213, 439/100; 174/68.2, 99 B; 361/378

[56] References Cited

U.S. PATENT DOCUMENTS

| | | | |
|---|---|---|---|
| 2,306,353 | 12/1942 | Cole et al. | 361/378 |
| 2,585,770 | 2/1952 | Hammerly | 361/378 |
| 3,263,131 | 7/1966 | Rowe | 439/212 |
| 3,383,458 | 5/1968 | Raskhodoff et al. | 439/212 |
| 3,391,378 | 7/1968 | Fisher | 439/212 |
| 3,922,053 | 11/1975 | Hafer | 439/114 |
| 4,082,393 | 4/1978 | Gamble | 439/110 |
| 4,146,285 | 3/1979 | Cook | 439/213 |
| 4,714,431 | 12/1987 | McGoldrick et al. | 439/212 |

FOREIGN PATENT DOCUMENTS 3437586 4/1986 Fed. Rep. of Germany ...... 439/213

OTHER PUBLICATIONS

Siemens-Allis, I-T-E XJ-L Busway System, Selection and Application Guide, Bulletin 5.3-1C, pp. 1-8.

*Primary Examiner*—Gary F. Paumen

[57] ABSTRACT

A busway of the type having a plurality of power bus elements inside a grounded housing and a ground conductor conductively fixed to the housing is provided with a ground bus element which is insulated from the housing for connection as an isolated ground for equipment which is to be protected from spurious power surges in the ground conductor of the housing.

19 Claims, 1 Drawing Sheet

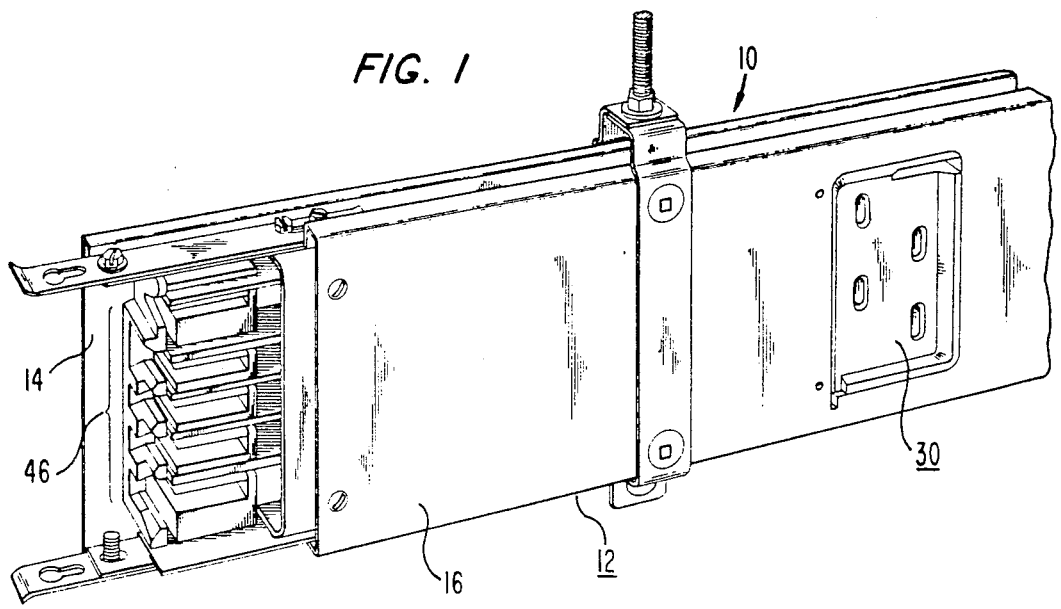
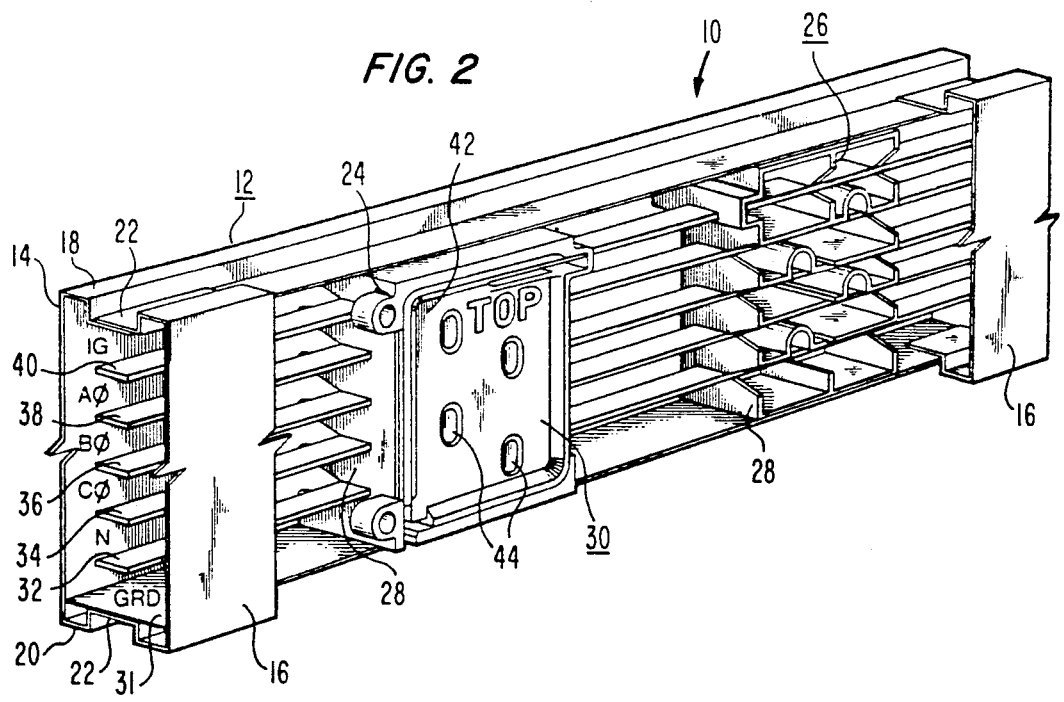

ELECTRICAL POWER DISTRIBUTION BUSWAY WITH ISOLATED GROUND BUS

This is a continuation of application Ser. No. 288,530, filed Dec. 22, 1988, abandoned.

TECHNICAL FIELD

The invention relates to electrical power distribution systems, particularly those serving equipment sensitive to power surges.

BACKGROUND OF THE INVENTION

The distribution of electrical power within user facilities may be accomplished with wire and cable, with or without protective conduit. However, where easy access and flexibility are at a premium, such as in research or industrial settings, it is common to use busway sections which fit together and can be hung or wall mounted. These sections can be disassembled from each other and be reconfigured as desired without as much material waste and labor as would be the case with a wired or cable system.

The types of settings referred to above frequently include highly sensitive electrical equipment, such as a computer, served by the same busway as other electrical equipment, such as electrical motors, which can introduce a power surge into the electrical system serving them. It has been found that in such a situation the power surge is capable of traveling through the ground conductor to the sensitive equipment on the same system and causing disruption there.

SUMMARY OF THE INVENTION

In accordance with the present invention, there is provided a busway assembly which includes at least one isolated ground bus by means of which equipment connected to the power busway assembly can be provided with a ground conductor which is isolated from other equipment connected to the power busway which may introduce power surges in the ground conductor connected to the housing.

BRIEF DESCRIPTION OF THE DRAWINGS

FIG. 1 is an elevated perspective of an electrical power distribution busway assembly in accordance with one embodiment of the present invention.

FIG. 2 is a partially cut-away, sectioned elevated perspective view of a fragment of the busway assembly of FIG. 1.

DETAILED DESCRIPTION

A preferred embodiment of the invention in the form of a busway assembly section 10 is shown in FIG. 1 and also shown in a cut-away view in FIG. 2 to illustrate the interior components. The same reference symbols are used in both figures for corresponding elements. The busway assembly includes a housing formed of sheet, steel with a generally rectangular cross-section. The housing 12 has side walls 14,16, a top wall 18, and a bottom wall 20. The top and bottom walls are formed with channels 22 for added structural rigidity. Seated within the housing at fixed spacings longitudinally are spacers 24,26, which are identical to each other, but are oriented in reverse directions. The spacers 24,26 each have a plurality of mutually spaced-apart, shelf-like insulating supports 28 which are integrally molded with a base 30 of electrically insulating material, such as a thermoplastic resin.

Installed along the inside surface of the bottom wall 20 over the channel 22 is a ground conductor 31 in the form of a copper strap. Pressed in place between the supports 28 of the spacers are five busbars 32,34,36,38,40 which are cut from copper or aluminum stock. The bottom one is designed to act as a neutral conductor. The next three higher ones 34,36,38 are for the three respective phases of the supplied power. The top one 40 is for use as an isolated ground bus.

The spacers 24,26 have a receptacle face 42 on one side which is provided with four receptacle openings 44 for receiving plug contacts of an outlet assembly or some other component. It can be seen from the spacer 26 that the plug openings 44 are designed as a partially open circle, so that the adjacent busbars will be resiliently engaged by an oval plug of a component inserted into the openings 44. The housing 12 includes openings in registry with the receptacle faces 42 to expose them for access. Cover plates of sheet steel, not shown, may be installed over these openings as an optional accessory.

Sections of the busway assembly 10 are adapted at their ends with mutually engaging connectors 46 for readily connecting one section to the other both mechanically and electrically. The details of the connectors 46 will not be discussed, since they are not particularly essential to the present invention and since various arrangements which are known to those skilled in the art could be used to perform the connection function, provided that they include the insulated ground bus 40 in addition to the other bus bars.

In the use of the busway assembly 10, the power connections are made as they normally would be. However, the ground terminal of the equipment is connected to the isolated ground bus 40 instead of to the ground conductor 31 of the housing. This means that the isolated ground bus 40 must also be connected elsewhere to the ground terminal at the service entrance. For a given distribution system, there may be several isolated ground buses connected to different equipment, and connected in common only at the service entrance. This completely isolates the equipment so connected from surges which may appear in the ground conductor of the housing as a result of the operation of other equipment which is not connected to an isolated ground bus, but which instead has its ground terminal connected to the ground conductor associated with the housing. As a result, the operation of sensitive equipment, particularly computers, is safeguarded from such interference effects.

I claim:

1. A power distribution system, comprising:
   a service entrance connectable to a source of electrical power;
   first electrical equipment capable of introducing a power surge into the system;
   second electrical equipment which is sensitive to a power surge; and
   a busway that transmits electrical power from the service entrance to the first and second equipment, which busway include a conductive housing, a first busbar connected to a first power phase conductor of the service entrance, a second busbar connected to a second power phase conductor of the service entrance, a third busbar connected to a third power phase conductor of the service entrance, a fourth, neutral bushbar connected to a neutral conductor of the service entrance, a fifth, ground busbar connected to ground at the service entrance, electrically insulating spacers mounted within the housing, which spacers support the first through fifth busbars in a spaced-apart, generally parallel relationship inside the housing, whereby the ground busbar is isolated from the conductive housing of the busway, a ground conductor connected to the housing and to ground at the service entrance and electrically isolated from the isolated ground busbar within the housing, and electrical connections which connect the first and second electrical equipment to the busway, whereby the first equipment is connected to first through fourth busbars and to the ground conductor, and whereby the second, surge-sensitive equipment is connected to the first through fifth busbars and is free of contact with the ground conductor.

2. The system of claim 1, wherein the electrical connections comprise a plurality of receptacles disposed in spaced positions along the busway.

3. The system of claim 2, wherein the second equipment comprises a computer.

4. The system of claim 3, wherein the first equipment comprises a motor.

5. The system of claim 2, wherein the busway comprises a series of busway sections connected end-to-end, wherein, in each section, the housing comprises sheet metal generally rectangular in cross-section, the first through fifth busbars and the ground conductor comprise conductive metal strips extending in the lengthwise direction of the busway, the spacers comprise a plurality of insulating supports extending transversely within the housing and having five spaced grooves into which each of the first through fifth busbars are inserted.

6. The system of claim 1, wherein the ground conductor comprises a conductive metal strip disposed in face-to-face contact with a wall of the busway housing.

7. A method of distributing power from a service entrance to a plurality of different types of electrical equipment, including first electrical equipment capable of introducing a power surge into the system and second electrical equipment which is sensitive to power surges created by the first equipment, which method comprises:
connecting the first electrical equipment to a busway, which busway includes a conductive housing, a plurality of power supply busbars connected to corresponding power conductors of the service entrance, an isolated ground busbar connected to ground at the service entrance, electrically insulating spacers mounted within the housing, which spacers support the busbars in a spaced-apart, generally parallel relationship inside the housing, whereby the ground busbar is isolated from the conductive housing of the busway, a ground conductor connected to the housing and to ground at the service entrance and electrically isolated from the isolated ground busbar within the housing, and electrical connections whereby the first equipment is connected to the power supply busbars and to the ground conductor, and is free of contact with the isolated ground busbar;
connecting the second, surge-sensitive equipment to the power supply busbars and to the isolated ground busbar in a manner so that the second equipment is free of contact with the ground conductor; and
energizing the busway at the service entrance to provide power to the first and second equipment.

8. The method of claim 7, wherein the power supply busbars include a first busbar connected to a first power phase conductor of the service entrance, a second busbar connected to a second power phase conductor of the service entrance, a third busbar connected to a third power phase conductor of the service entrance, and a fourth, neutral busbar connected to a neutral conductor of the service entrance.

9. The method of claim 7, wherein the electrical connections comprises a plurality of receptacles disposed in spaced positions along the busway, and the connecting steps further comprise plugging a component for transmitting power to the first and second equipment into each respective receptacle.

10. The method of claim 7, wherein the second equipment comprises a computer.

11. The method of claim 7, wherein the first equipment comprises a motor.

12. A busway for use in a power distribution system, comprising:
an elongated, electrically conductive housing;
five busbars disposed within the housing and extending in the lengthwise direction thereof, the housing containing no more than five such bars, which busbars include a first busbar connectable to a first power phase conductor of a service entrance, a second busbar connectable to a second power phase conductor of the service entrance, a third busbar connectable to a third power phase conductor of the service entrance, a neutral busbar connectable to a neutral conductor of the service entrance, and an isolated ground busbar connectable to a ground of the service entrance;
electrically insulating spacers mounted within the housing, which spacers support the busbars in a spaced-apart, generally parallel relationship inside the housing, whereby the busbars are isolated from the conductive housing;
a ground conductor connected to the housing and electrically isolated from the busbars within the housing; and
a receptacle having openings whereby equipment may be connected to each of the five busbars.

13. The busway of claim 12, wherein the housing comprises sheet metal generally rectangular in cross-section, the busbars and the ground conductor comprise conductive metal strips extending in the lengthwise direction of the busway, and the spacers comprise a plurality of insulating supports substantially spanning the housing transversely within the housing and having five spaced grooves into which the busbars are inserted.

14. The busway of claim 12, wherein the ground conductor comprises a metal strip disposed in face-to-face contact with a wall of the busway housing.

15. The busway of claim 12, wherein the receptacle has no more than five openings for busbar connections, and connects only to the five spaced, parallel busbars.

16. A method for distributing electrical power through a busway, which busway comprises an elongated, electrically conductive housing, five busbars disposed within the housing and extending in the lengthwise direction thereof, electrically insulating spacers mounted within the housing, which spacers support the busbars in a spaced-apart, generally parallel relationship inside the housing, whereby the busbars are isolated from the conductive housing, a ground conductor connected to the housing and electrically isolated from the busbars within the housing, and a receptacle having openings whereby equipment may be connected to each of the five busbars, the method comprising:

maintaining one of the busbars at a neutral potential;

applying a current in three phases to three of the busbars;

maintaining one of the busbars at a first ground potential; and maintaining the ground conductor at a second ground potential which may vary from the first ground potential.

17. The method of claim 16, wherein the ground conductor comprises a metal strip disposed in face-to-face contact with a wall of the busway housing.

18. The method of claim 16, wherein the receptacle has no more than five openings for busbar connections, and connects only to the five spaced, parallel busbars.

19. A busway energized by the method of claim 16.

* * * * *